United States Patent
Walker et al.

(10) Patent No.: US 11,514,409 B2
(45) Date of Patent: Nov. 29, 2022

(54) CRYPTOGRAPHIC CURRENCY FOR SECURITIES SETTLEMENT

(71) Applicant: Goldman Sachs & Co. LLC, New York, NY (US)

(72) Inventors: Paul Walker, New York, NY (US); Phil J. Venables, New York, NY (US)

(73) Assignee: Goldman Sachs & Co. LLC, New York, NY (US)

( * ) Notice: Subject to any disclaimer, the term of this patent is extended or adjusted under 35 U.S.C. 154(b) by 1113 days.

(21) Appl. No.: 15/618,508

(22) Filed: Jun. 9, 2017

(65) Prior Publication Data

US 2017/0278081 A1    Sep. 28, 2017

Related U.S. Application Data

(62) Division of application No. 14/528,289, filed on Oct. 30, 2014, now Pat. No. 9,704,143.

(Continued)

(51) Int. Cl.
*G06Q 20/06*    (2012.01)
*G06Q 20/38*    (2012.01)
(Continued)

(52) U.S. Cl.
CPC .......... *G06Q 20/06* (2013.01); *G06Q 20/065* (2013.01); *G06Q 20/36* (2013.01); *G06Q 20/3674* (2013.01); *G06Q 20/3678* (2013.01); *G06Q 20/382* (2013.01); *G06Q 40/04* (2013.01); *H04L 9/30* (2013.01); *H04L 9/3236* (2013.01);

(Continued)

(58) Field of Classification Search
None
See application file for complete search history.

(56) References Cited

U.S. PATENT DOCUMENTS 9,704,143 B2    7/2017  Walker et al.
2008/0195499 A1*  8/2008  Meredith ............... G06Q 20/10
                                                           705/26.3

(Continued)

FOREIGN PATENT DOCUMENTS

WO        2012123394 A1    9/2012
WO    WO-2012123394 A1 *  9/2012  ........... G06F 21/335

OTHER PUBLICATIONS

Hochstein, "Why Bitcoin Matters", Mar. 2014, retrieved on Dec. 10, 2016 from: https://www.promontory.com/uploadedFiles/Articles/News/Why%20Bitcoin%20Ma-tters%20for%20Bankers%20SHAPIRO%200314.pdf.

(Continued)

*Primary Examiner* — Steven S Kim
*Assistant Examiner* — Jason B Fenstermacher

(57) ABSTRACT

The present disclosure is directed to security settlement in financial markets and cryptographic currencies. Particular portions of the present disclosure are directed to a cryptographic currency protocol and to a cryptographic currency that includes a positional item. The cryptographic currency protocol supports a virtual wallet that, in various embodiments, is a security and cash account for storing and managing the cryptographic currency. Opening a transaction via the virtual wallet to transfer the cryptographic currency is a strong guarantee of the availability of funds in the virtual wallet because, e.g., funds are not transacted unless the commit phase is successful.

21 Claims, 7 Drawing Sheets

Related U.S. Application Data

(60) Provisional application No. 61/994,650, filed on May 16, 2014.

(51) Int. Cl.
  *G06Q 20/36* (2012.01)
  *G06Q 40/04* (2012.01)
  *H04L 9/32* (2006.01)
  *H04L 9/30* (2006.01)
  *H04L 9/40* (2022.01)
  *H04L 9/00* (2022.01)

(52) U.S. Cl.
  CPC .......... *H04L 9/3247* (2013.01); *H04L 63/126* (2013.01); *H04L 9/50* (2022.05); *H04L 2209/56* (2013.01)

(56) References Cited

U.S. PATENT DOCUMENTS

| | | | | |
|---|---|---|---|---|
| 2012/0330846 A1* | 12/2012 | Light | ................ | G06Q 20/3827 705/75 |
| 2013/0218763 A1* | 8/2013 | Wilkes | ................... | G06Q 20/10 705/40 |
| 2014/0052598 A1 | 2/2014 | Briem | | |
| 2015/0046337 A1 | 2/2015 | Hu et al. | | |
| 2015/0170112 A1* | 6/2015 | DeCastro | ............. | G06Q 20/381 705/39 |
| 2015/0287026 A1* | 10/2015 | Yang | ..................... | G06Q 20/06 705/69 |
| 2015/0332256 A1 | 11/2015 | Minor | | |

OTHER PUBLICATIONS

Naik, "Optimising the SHA256 Hashing Algorithm for Faster and More Efficient Bitcoin Mining", Sep. 2, 2013, retrieved on Dec. 10, 2016 from: http://www.nicolascourtois.com/bitcoin/Optimising%20the%SHA256%20Ha- shing%20Algorithm%20for%20Faster%20and%20More%20Efficient%20Bitcoin%20Mini- ng.sub.-Rahul.sub.-Naik.pdf.

Malhotra, "Bitcoin Protocol: Model of 'Cryptographic Proof' Based Global Crypto-Currency & Electronic Payments System", Dec. 4, 2013, retrieved from: https://web.archive.org/web/20131230215333/http://yogeshmalhotra.com/Bitc-oinProtocol.html on Jul. 11, 2016.

\* cited by examiner

CRYPTOGRAPHIC CURRENCY FOR SECURITIES SETTLEMENT

CROSS REFERENCE TO RELATED APPLICATIONS

This application is a divisional of U.S. patent application Ser. No. 14/528,289 filed Oct. 30, 2014 (now U.S. Pat. No. 9,704,143), which claims priority to U.S. Provisional Application Ser. No. 61/994,650 filed May 16, 2014. The contents of both applications are incorporated herein by reference in their entirety for all purposes.

FIELD

The present disclosure relates generally to systems, apparatuses, and methods for settling securities in financial markets using distributed, peer-to-peer, and cryptographic techniques.

BACKGROUND

The settlement of securities involves a process whereby securities or interests in securities (e.g., debt, equity, or derivative contracts) are delivered, usually against payment of money. A number of risks arise for the parties during the settlement interval that follows trading and precedes settlement. For example, after a trade for a security and before settlement, the rights of the purchaser are contractual and therefore personal; however, because such rights are merely personal, these rights are at risk in the event of the insolvency of the either counterparty to the trade. After settlement, the purchaser owns the securities, and the purchaser' rights are proprietary. Clearing involves modifying contractual obligations to facilitate settlement. Clearing houses, such as the National Securities Clearing Corporation (NSCC), provide clearing, settlement, risk management, central counterparty services, and a guarantee of completion for certain transactions (e.g., broker-to-broker trades, depositary receipts, and exchange-traded funds), and they serve as the central counterparty for trades in the U.S. securities markets. In the United States, the settlement date for marketable stocks can be an extended length of time—three business days after the trade is executed and for listed options and government securities it is usually one day after the execution.

A cryptographic currency is a digital medium of exchange that enables distributed, rapid, cryptographically secure, confirmed transactions for goods and/or services. One of the first cryptographic currencies to come to broad attention was Bitcoin, which is based on a peer-to-peer network, in 2009. Since then, numerous cryptographic currencies have become available, such as Litecoin, Novacoin, Namecoin, Feathercoin, Terracoin, Dogecoin, and Peercoin. Fundamentally, cryptographic currencies are specifications regarding the use of currency that seek to incorporate principles of cryptography (e.g., public-key cryptography) to implement a distributed and decentralized information economy. A digital currency, e.g., a bitcoin used in Bitcoin, is computationally brought into existence by an issuer (e.g., a bitcoin is "mined"). Digital currency can be stored in a virtual cryptographic wallet, (hereinafter "wallet"), i.e., a software and/or hardware technology to store cryptographic keys and cryptographic currency. Digital currency can be purchased (e.g., for U.S. dollars at an ATM or at an exchange), sold (e.g., for goods and/or services), traded, or exchanged for a different currency or cryptographic currency, for example. A sender makes a payment (or otherwise transfers ownership) of digital currency by broadcasting (e.g., in packets or other data structures) a transaction message to nodes on a peer-to-peer network. The transaction message includes the quantity of virtual currency changing ownership (e.g., 4 bitcoins) and the receiver's (i.e., the new owner's) public key-based address. Transaction messages are sent through the Internet, without the need to trust a third party, so settlements are extremely timely and efficient.

DETAILED DESCRIPTION

Figure 1:
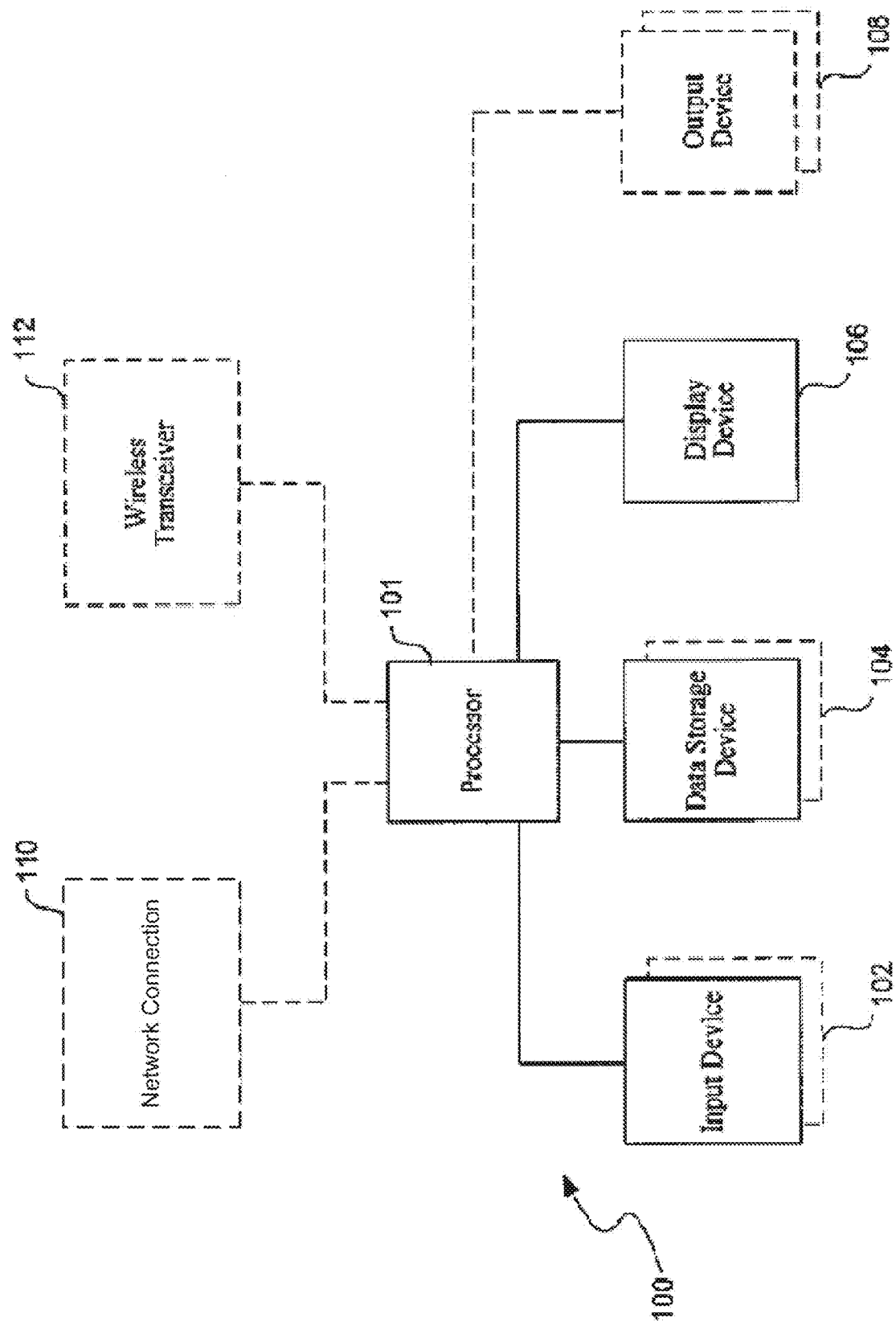
FIG. 1 is a hardware diagram showing components of a typical computer system on which the described technology executes.

The described technology concerns one or more methods, systems, apparatuses, and mediums storing processor-executable process steps to substantively instantly settle securities, based on cryptographic currency technology, without the risks associated with traditional settlement technologies.

In various embodiments, the described technology provides a virtual multi-asset wallet as a traditional securities and cash account for an individual, investor, and/or trader ('trader'). The wallet has technology to generate, manipulate, and store a new cryptographic currency, referred to as SETLcoins, for exchanging assets, such as securities (e.g., stocks, bonds, etc.) cash, and/or cash equivalents via a peer-to-peer network. In one or more embodiments, the described technology facilitates transactions between virtual wallets and, in the same and/or other embodiments, between a virtual wallet and non-virtual wallet technologies (and vice versa) on the same peer-to-peer network. For example, a virtual wallet can exchange (e.g., via a transaction method described below, such as a two-phase transaction) one or more SETLcoins for, e.g., U.S. dollars and/or other currency at a brokerage account, deposit account, bank account or other financial storage entity. Alternative or additionally, U.S. dollars and/or other currency at a brokerage account, deposit account, bank account or other financial storage entity can be exchanged for one or more SETLcoins in virtual wallet on the peer-to-peer network.

As implemented by the described technology, a trader no longer trades securities by meeting at an exchange with an indication of cash for security and then settles the transaction seconds, hours, or days later, meanwhile bearing all of the associated credit risk in the interim. Traders using the described technology exchange securities by presenting an open transaction on the associated funds in their respective wallets. SETLcoin ownership is immediately transferred to a new owner after authentication and verification, which are based on network ledgers within a peer-to-peer network, guaranteeing nearly instantaneous execution and settlement.

In some embodiments, the described technology provides a peer-to-peer cryptographic currency trading method for initiating a market exchange of one or more SETLcoins in a virtual wallet for purchasing an asset (e.g., a security) at a purchase price. The described technology can determine, via a two-phase commit, whether the virtual wallet has a sufficient quantity of SETLcoins to purchase the asset at the purchase price. In various embodiments, in response to verifying via the two-phase commit that the virtual wallet has a sufficient quantity of SETLcoins, the described technology purchases (or initiates a process in furtherance of purchasing) the asset with at least one of the SETLcoins. In one or more embodiments, if the described technology determines that the virtual wallet has insufficient SETLcoins for purchasing the asset, the purchase is terminated without exchanging SETLcoins.

Various embodiments of the technology will now be described. The following description provides specific details for a thorough understanding and enabling description of these embodiments. One skilled in the art will understand, however, that the described technology may be practiced without many of these details. Additionally, some well-known structures or functions may not be shown or described in detail, so as to avoid unnecessarily obscuring the relevant description of the various embodiments.

The terminology used in the description presented below is intended to be interpreted in its broadest reasonable manner, even though it is used in conjunction with a detailed description of certain specific embodiments of the technology. Certain terms may even be emphasized below; however, any terminology intended to be interpreted in any restricted manner will be overtly and specifically defined as such in this Detailed Description section.

The techniques introduced below can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

In one or more embodiments, the described technology adapts and/or generates cryptographic wallet which holds a new cryptographic currency (CC) (i.e., an SETLcoin) and corresponding cryptographic protocol for exchanging securities between nodes on a peer-to-peer network. Rather that representing a single transferable, object an SETLcoin wallet holds multiple positionable items (e.g., a security item, such as a share), herein referred to as a Positional Item inside Cryptographic currency (PIC), and a position (i.e., a quantity of the PIC represented by an SETLcoin wallet). A PIC is an agreed upon reference used by the peer-to-peer network to refer to, e.g., a particular security. For example, "IBM" (the stock market symbol of the company by the same name) can also be a PIC used by the peer-to-peer network to refer to IBM stock. A PIC, in some embodiments, is determined (and invalidated) by an issuer. An issuer (e.g., a company, underwriter, municipality, government, etc.) can have multiple PICs to represent different types of securities. For example, IBM stocks can be represented by PIC "IBM-S" and IBM bonds by PIC "IBM-B". In some embodiments, PICs are issued (and destroyed) by highly authoritative entities. For example, dollars available on the SETLcoin network represented by, e.g., PIC "USD" may be authoritatively issued by, for example, the U.S. Treasury. However, the described technology can issue PICs based on various other techniques (e.g., network node agreement, exchange regulation, lease or purchase, auction, etc.) and can be named based on, e.g., a company's name, its market symbol, its branding, its security name, availability, or a preferred format (e.g., length, abbreviation, etc.).

An SETLcoin wallet or transaction can house a single security, as described above, or multiple denominations of the same security (e.g., 1 IBM-S SETLcoin valued at 100 IBM shares). SETLcoin wallets or transactions may also house multiple securities (e.g., 1 IBM-S SETLcoin and 2 GOOG-S SETLcoins). SETLcoins are exchangeable for, e.g., other SETLcoins and/or other cryptographic currencies (e.g., peercoins). For example, a single IBM-S SETLcoin may be exchangeable for one or more "GOOG" SETLcoins (i.e., Google shares), for 13,000 USD SETLcoins, 100 litecoins, and/or for 5 bitcoins.

The described technology, in various embodiments, generates and/or modifies a cryptographic currency wallet for enabling a trader to use a wallet as his security and cash account. The wallet is a software and/or hardware component for facilitating market transactions, securely storing SETLcoins on multiple PICs (e.g., via one or more private keys), and providing other technology such as generating and maintaining cryptographic keys, generating local and network messages, generating market orders, updating ledgers, performing currency conversion, and providing market data, for example. The wallet stores SETLcoins regardless of their PIC, position, or quantity (e.g., a 100 stock IBM-S SETLcoin can reside in the same wallet as a 4 stock IBM-B SETLcoin, a single CITI-bond SETLcoin, and a single 100 MSFT-CS SETLcoin (e.g., an MSFT-CS SETLcoin having a "face value" of 100 Microsoft common stocks). In some embodiments, the wallet can substitute fungible currencies. For example, 100 individual SETLcoins of the same PIC (e.g., 100 individual GOOG-S SETLcoins) can be internally exchanged by the described technology for a single 100 GOOG-S SETLcoin.

As described above, in various embodiments, the described technology generates SETLcoin transactions based on the wallet's content. For example, Trader A decides to exchange 5 IBM-S SETLcoins to Trader B in exchange for Trader B's 100 bitcoins. Trader A enters his order into his wallet, and Trader B enters her order into her wallet. Based on the orders, the described technology generates the appropriate transaction messages, which are broadcast to the network for authentication and verification.

Once each transaction is sent to the network, in one or more embodiments, settlement is immediate; therefore, each trader must be prepared to make the trade and have the assurance that the other trader is prepared to do the same. Various techniques are used by the described technology to coordinate the processes of trading SETLcoins for cryptographic currency (e.g., bitcoins) and/or for other SETLcoins. The described technology, in various embodiments, implements an atomic commitment protocol, such as a two-phase commitment protocol, to ensure that both traders are ready to send their respective transaction messages. A coordinator of the two-phase commitment is, in some embodiments, a trusted node, for example a node that both traders mutually agree to have act as coordinator (including each other). In additional and/or alternative embodiments, the coordinator is elected based on the network protocol. For example, a node can be elected as coordinator based on random or pseudo-random token exchange, uptime, number of validated transactions sent, or other qualifier. Regardless of the coordinator, after each node is committed, appropriate transaction messages are broadcast to transfer SETLcoin ownership. In some embodiments, the described technology can modify trading protocols such that two traders share an open transaction and close it to settle. For example, a trader with a wallet which can give 1000 USD can share an open transaction to exchange, e.g., 10 IBM-S in a different wallet. The coordinator can close the transaction as part of a two-phase commit.

SETLcoin ownership is transferred via one or more transaction messages. A transaction message includes a transaction and a digital signature. The transaction includes, for example, the SETLcoin, the receiver's (i.e., the new owner's) electronic address, and, in some embodiments, ownership history (i.e., a record of previous SETLcoin ownership used by the network to verify proper chain of title). Addresses are based, in various embodiments, on one or more cryptographic protocols (e.g., public-key cryptography). Public-key cryptography requires two separate keys, one of which is secret (i.e., a private key) and one of which is public (i.e., a public key). Although different, the two keys are mathematically linked. The public key is used to encrypt plaintext (e.g., for creating an address for receiving an SETLcoin) and for verifying a digital signature. The private key is used to decrypt cipher text, to create a digital signature, and to secure SETLcoins. Public keys are freely shared among nodes in the peer-to-peer network, for example by broadcasting one or more key-exchange messages. The transaction message, in various embodiments, is digitally signed by the sender's private key to authenticate the sender's identity to the network nodes, e.g., by decrypting the sender's digitally signed transaction message using the sender's public key to verify that the sender originated the transaction.

The described technology, in various embodiments, verifies SETLcoin ownership to prevent fraud. SETLcoin ownership is based on ownership entries in ledgers that are maintained by network nodes. The ledgers are mathematically linked to the owners' public-private key pairs generated by the owners' respective wallets, for example. Ledgers record entries for each change of ownership of each SETLcoin exchanged in the network. A ledger is a data structure (e.g., text, structured text, a database record, etc.) that resides on all or a portion of the network nodes. After an SETLcoin transaction (i.e., a message indicating a change of ownership) is broadcast to the network, the nodes verify in their respective ledgers that the sender has proper chain of title, based on previously recorded ownership entries for that SETLcoin. Verification of a transaction is based on mutual consensus among the nodes. For example, to verify that the sender has the right to pass ownership to a receiver, the nodes compare their respective ledgers to see if there is a break in the chain of title. A break in the chain of title is detected when there is a discrepancy in one or more of the ledgers, signifying a potentially fraudulent transaction. A fraudulent transaction, in various embodiments, is recorded (e.g., in the same ledger or a different ledger and/or database) for use by the authorities, for example (e.g., the Securities and Exchange Commission). If the nodes agree that the sender is the owner of the SETLcoin, the nodes' ledgers are updated to indicate a new ownership transaction, and the receiver becomes the SETLcoin's owner. Verification protocols of other cryptographic currencies, in one or more embodiments, are used or can be modified for use by the described technology to verify those cryptographic currencies' ownership rights (e.g., bitcoins are validated based on "blocks" in a "block chain"). Regardless of the specific protocol(s) used, the receiver becomes the currency's owner after the chain of title is verified and the ledger is updated.

When an SETLcoin is first created (i.e., by an issuer) there are no previous owners from which to verify ownership in the ledgers. In one or more embodiments, the issuer can maintain the same private key for digitally signing each SETLcoin as it is issued and entered into in the ledgers. That private key, in turn, can be validated by mutual agreement between the nodes, by a trusted third party (e.g., the Securities and Exchange Commission), or by one or more other security mechanisms.

Using the described technology mentioned above and described in further detail below in reference to FIGS. 1-7, settlements are nearly instantaneous because cryptographic currency transactions are independently and extemporaneously generated, verified, and executed within the network, without the risks associated with traditional clearing houses that can delay settlements for several days.

Certain details are set forth in the following description and in FIGS. 1-7 to provide a thorough understanding of various embodiments of the present disclosure. Other well-known structures and systems often associated with market orders, cryptographic currencies, peer-to-peer networks, and related commerce systems have not been shown or described in detail below to avoid unnecessarily obscuring the descriptions of the various embodiments of the present disclosure. Additionally, a person of ordinary skill in the relevant art will understand that the present disclosure may have additional embodiments that may be practiced without several of the details described below. In other instances, those of ordinary skill in the relevant art will appreciate that the methods and systems described can include additional details without departing from the spirit or scope of the disclosed embodiments.

Many of the details, dimensions, functions, and other features shown and described in conjunction with the Figures are merely illustrative of particular embodiments of the present disclosure. Accordingly, other embodiments can have other details, dimensions, functions, and features without departing from the spirit or scope of the present disclosure. In addition, those of ordinary skill in the art will appreciate that further embodiments of the present disclosure can be practiced without several of the details described below.

FIG. 1 and the following discussion provide a brief, general description of a suitable computing environment in which aspects of the described technology can be implemented. Although not required, aspects of the technology may be described herein in the general context of computer-executable instructions, such as routines executed by a general- or special-purpose data processing device (e.g., a server or client computer). Aspects of the technology described herein may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer-implemented instructions, data structures, screen displays, and other data related to the technology may be distributed over the Internet or over other networks (including wireless networks) on a propagated signal on a propagation medium (e.g., an electromagnetic wave, a sound wave, etc.) over a period of time. In some implementations, the data may be provided on any analog or digital network (e.g., packet-switched, circuit-switched, or other scheme).

The described technology can also be practiced in distributed computing environments where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Those skilled in the relevant art will recognize that portions of the described technology may reside on a server computer, while corresponding portions reside on a client computer (e.g., PC, mobile computer, tablet, or smart phone). Data structures and transmission of data particular to aspects of the technology are also encompassed within the scope of the described technology.

Referring to FIG. 1, the described technology employs a computer 100, such as a personal computer, workstation, phone, or tablet, having one or more processors 101 coupled to one or more user input devices 102 and data storage devices 104. The computer 100 is also coupled to at least one output device, such as a display device 106, and one or more optional additional output devices 108 (e.g., printer, plotter, speakers, tactile or olfactory output devices, etc.). The computer 100 may be coupled to external computers, such as via an optional network connection 110, a wireless transceiver 112, or both. For example, network hubs, switches, routers, or other hardware network components within the network connection 110 and/or wireless transceiver 112 can couple one or more computers 100.

The input devices 102 may include a keyboard and/or a pointing device such as a mouse. Other input devices are possible, such as a microphone, joystick, pen, game pad, scanner, digital camera, video camera, and the like. The data storage devices 104 may include any type of computer-readable media that can store data accessible by the computer 100, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network, such as a LAN, WAN, or the Internet (not shown in FIG. 1).

Figure 2:
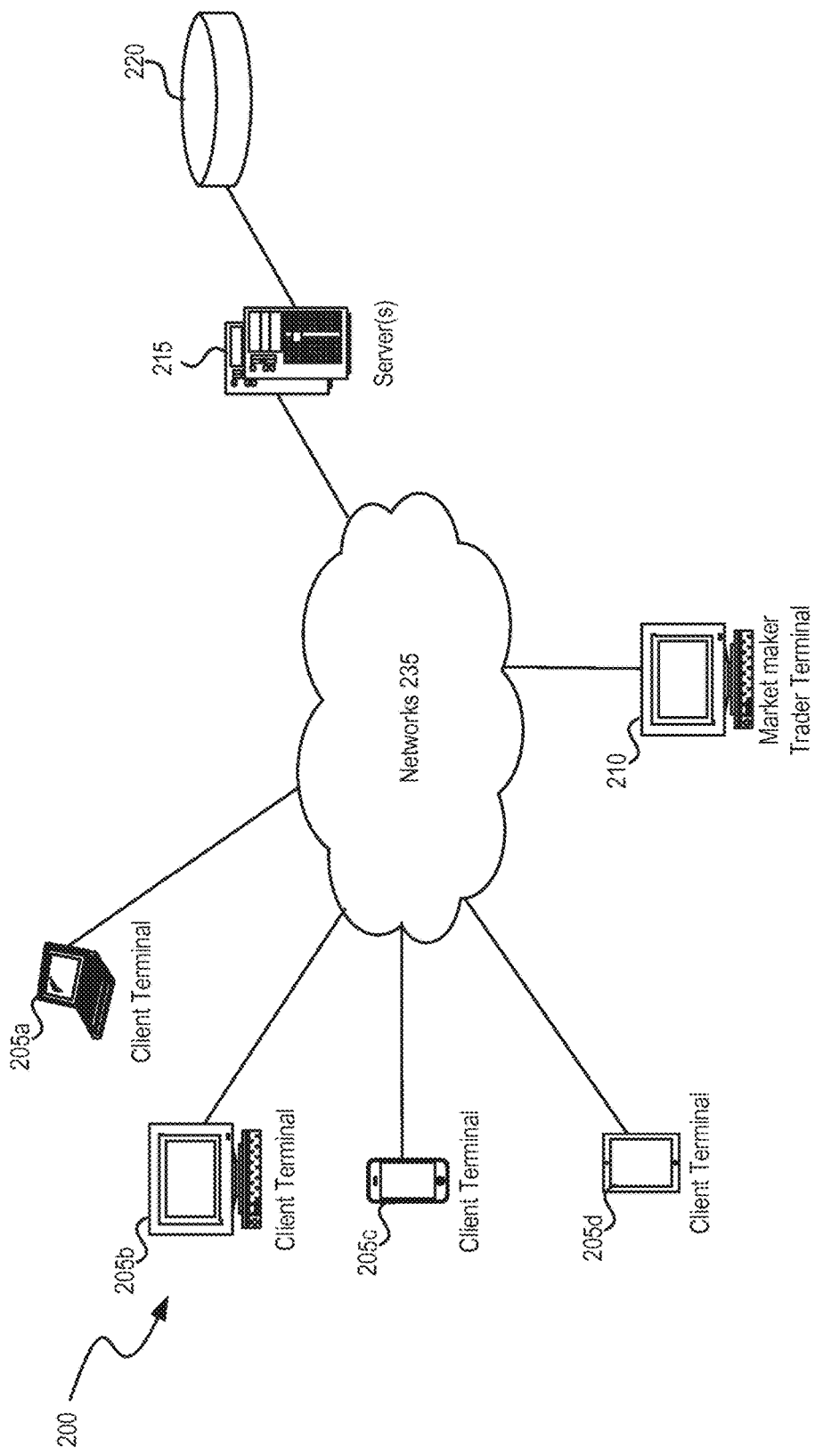
FIG. 2 a is diagram depicting an example environment within which the described technology may operate.

FIG. 2 is a diagram illustrating an example environment 200 within which the described technology may operate. Environment 200 may include client terminals (nodes) from which clients (e.g., via their wallets), or traders working on behalf of clients, may enter trade orders. For example, various financial products, such as bonds, stocks, options, commodities, futures, and the like, are exchangeable between nodes 205-215 in the form of SETLcoins and other cryptographic currencies. Non-limiting examples of client nodes include a laptop computer 205a, a desktop computer 205b, a mobile device 205c, a tablet device 205d, smart watches and smart glasses (not shown), and/or the like. Traders may utilize nodes 205a-205d to access an electronic trading platform. The environment 200 may also include one or more trader terminals, represented by terminal 210. Trader terminal 210 may be utilized by a trader who is working on behalf of the market maker, for example. Such market maker traders may oversee trade executions, inject additional liquidity to reduce order imbalances, and the like. The environment 200 may also include server(s) 215, which may be coupled to one or more databases and/or tables represented by database 220. Server(s) 215, in some embodiments, are dedicated or partially dedicated nodes that facilitate various aspects of the described technology (e.g., SETLcoin exchange, verification, two-phase commitment, issuance, etc.).

Client nodes 205a-205d, trader terminal 210, and servers 215 (e.g., a trading server and/or exchange server) may connect to and communicate with each other across peer-to-peer network 235 using secure communications protocols such as File Transfer Protocol (FTP), Hypertext Transfer Protocol (HTTP), Secure Hypertext Transfer Protocol (HTTP(s)), Secure Socket Layer (SSL), and/or the like. Examples of network 235 may include private and public peer-to-peer networks (e.g., as part of the Internet).

Figure 3:
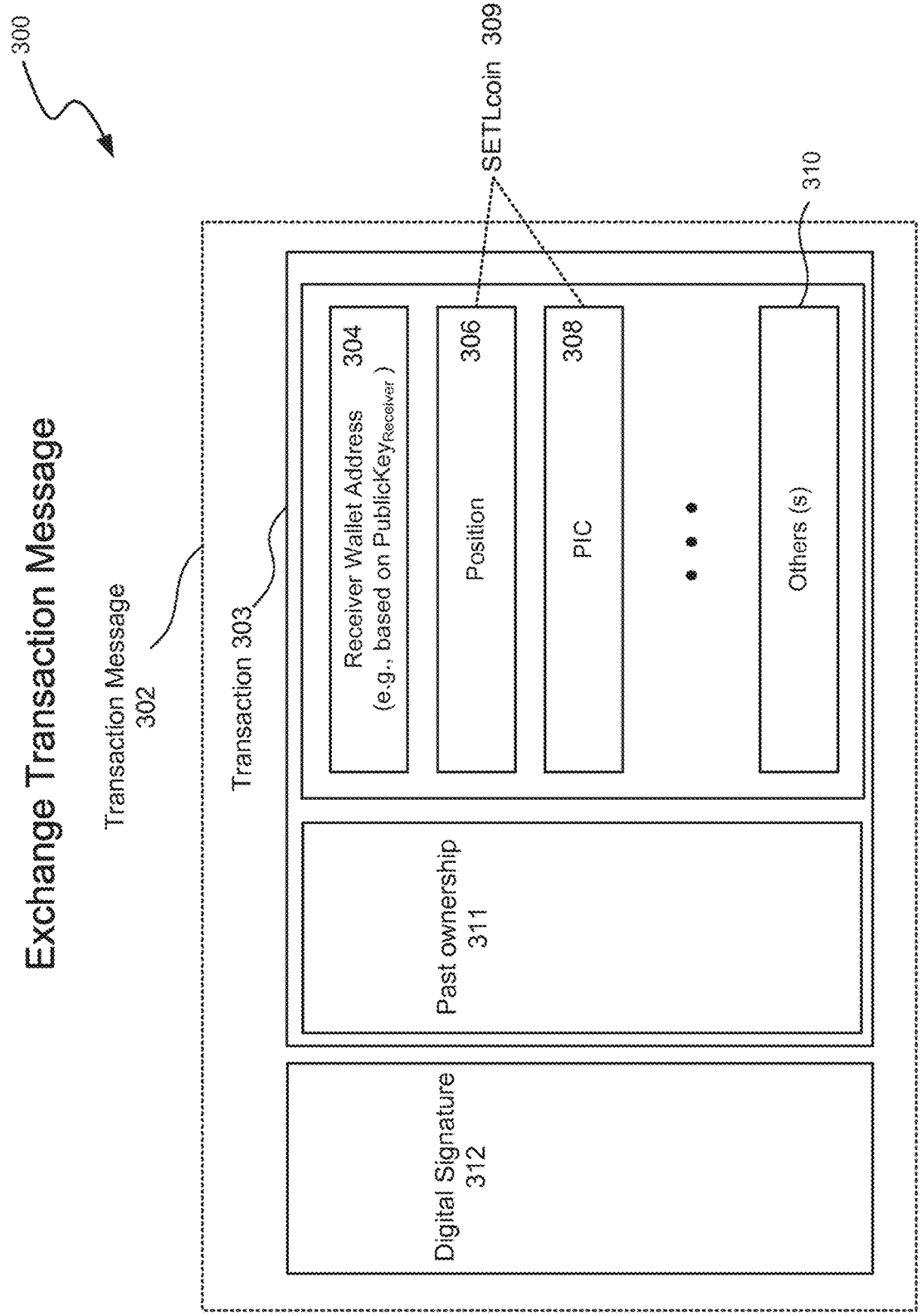
FIG. 3 is a diagram depicting an example transaction message.

FIG. 3 is a diagram 300 depicting an example transaction message 302. Transaction messages 302 are used by the described technology for changing SETLcoin 309 ownership. A transaction message 302 includes a transaction 303 and the sender's digital signature 312 of the transaction 303. The transaction 303 includes the recipient's address 304 (e.g., a hash value based on the receiver's public key), the SETLcoin 309 (i.e., a PIC 308 and its position 306), past ownership information 311 (if any), and optional other information 310 (e.g., a market order type to indicate whether the transaction is to buy or sell a SETLcoin 309). The transaction 303 is digitally signed by the sender's private key to create a digital signature 312 for verifying the sender's identity to the network nodes 205-215. The network nodes 205-215 decrypt the digital signature 312, via the sender's previously exchanged public key, and compare the unencrypted information to the transaction 303. If they match, the sender's authenticity is verified and, after a proper chain of ownership is verified via the ledgers (as explained above), the receiver is recorded in the ledgers as the new SETLcoin 309 owner.

Figure 4:
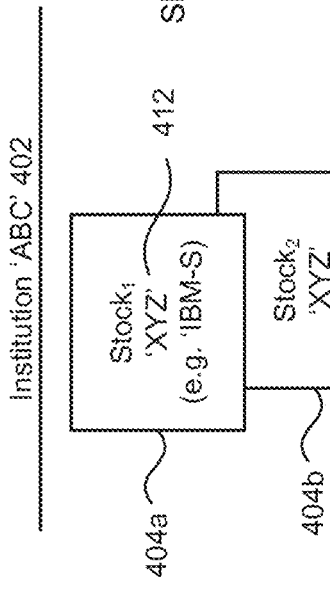
FIG. 4 is a diagram depicting example SETLcoins with different positions.

FIG. 4 is a diagram 400 depicting example SETLcoins 415 and 427, each having different positions 414 and 426. For example, institution ABC 402 is associated with PIC "XYZ" 412 that, for example, represents ABC's stock 404a-404n. As depicted in table 1 405, SETLcoin 415 has a position 414 of a single ABC stock (e.g., $Stock_1$ 404a) and is associated with public key 408 and private key 410. In other embodiments, a single SETLcoin 427 carries a value of multiple security positions. For example, as depicted in table 2 417, SETLcoin 427 has a position 426 of "2" XYZ stocks (e.g., $Stock_2$ 404b and $Stock_3$ 404c) and is associated with public key 420 and private key 422. In other words, a transaction 303 can include multiple SETLcoins 309 (e.g., 404a-404n). Additionally, a single SETLcoin 309 can have different denominations (e.g., a single SETLcoin 415 can have a "face value" of 3 XYZ stocks (e.g., 404a-404c)). It follows that other SETLcoins (not shown) for other PICs (not shown) can each have different positions and denominations, each of which can be stored in the same wallet. For example, a single "IBM-B" SETLcoin (i.e., an IBM bond SETLcoin) can carry a value of several individual "IBM-B" SETLcoins, and a single "GOOG-PS" SETLcoin (i.e., a Google preferred stock SETLcoin) can carry a value of one or more individual "GOOG-PS" SETLcoins. An SETLcoin's denomination is based on how the SETLcoin 309 is issued (e.g., by the underwriter) and, in some embodiments, how it was aggregated by the wallet 500 (described below).

Figure 5:
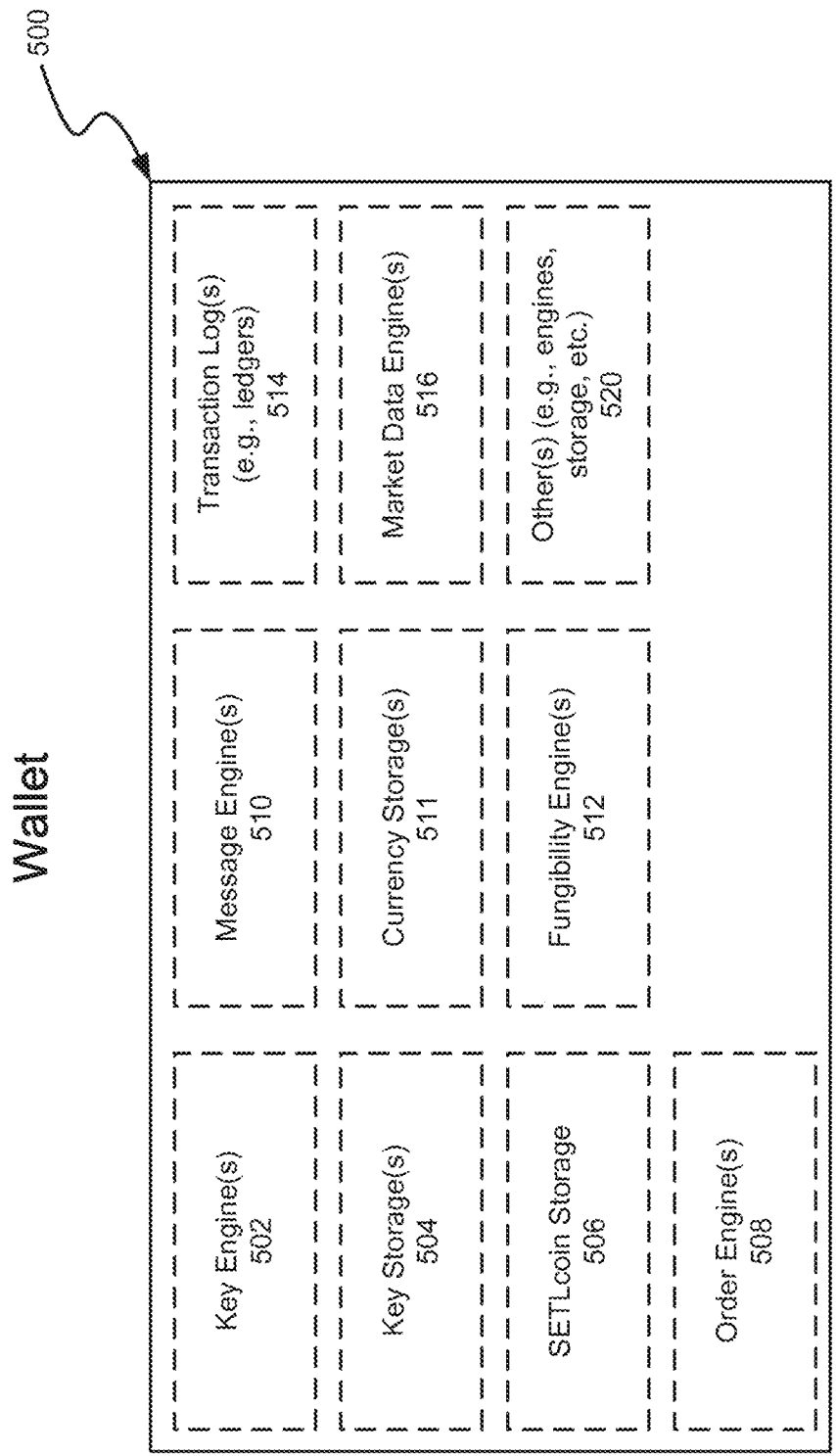
FIG. 5 is a diagram depicting an example virtual wallet.

FIG. 5 is a block diagram depicting an example virtual multi-asset wallet 500 (hereinafter referred to as wallet 500). The described technology provides a software and/or hardware wallet 500 for storing, sending, and managing SETLcoins, various other cryptographic currencies, and additional information. Wallet 500 contains and/or is associated with various components 502-520 to facilitate features of the described technology; however, wallet 500 is operable with a portion of the components 502-520. For example, wallet 500 includes one or more key engine components 502, key storage components 504, SETLcoin storage components 506, order engine components 508, message engine components 510, currency storage components 511, fungibility engine components 512, transaction log components 514, market data engine components 516, and various other components 520 that are used to implement various features of the described technology. Key engine component 502 generates public-private key pairs for sending and receiving SETLcoins, which are stored in SETLcoin storage component 506. Key storage component 504 stores locally generated public-private key pairs and, in some embodiments, keys received from other wallets 500 (e.g., a public key associated with a different trader's wallet 500). Order engine component 520, in some embodiments, generates market orders (or modifies transaction messages 302 to include order information, e.g., other information 310) for trading SETLcoins and various cryptographic currency. The order and/or modified transaction messages are, in one or more embodiments, broadcast to one or more nodes 205-215 that coordinate market trades. Message engine component 510 generates various messages used by the described technology for communicating between, e.g., nodes 205-215. For example, message engine component 510 can generate transaction messages 302 for exchanging SETLcoins between two or more traders' wallets 500. Currency storage component 511 is configured to store various types of monetary data and financial information, such as cryptographic currencies (e.g., bitcoins), cash equivalents, and banking and/or exchange account information (e.g., for communicating funds between a financial institution and the wallet 500). Fungibility engine component 512, in some embodiments, converts between various SETLcoins and/or other monetary data stored in currency storage component 511. For example, 100 individual IBM-S SETLcoins (i.e., each worth 1 IBM share) can be aggregated by the described technology into a single IBM-S SETLcoin having a "face value" of 100 IBM shares. Wallet 500 can generate any necessary ledger updates (e.g., to transaction log component 514) and messages for sending ledger updates, for example, to the other nodes 205-215 so that ownership rights are perfected for the newly aggregated SETLcoin. Transaction log components 514 are configured to store a variety of accessible data, such as local transaction information (e.g., the ledger data and other transactions made at or to the wallet 500, for example, based on one or more of the engine components 502, 508, 510, 512, and 516 and/or trader input) and remote transaction information (e.g., network information, node operation information, and protocol information). Market data engine component 516, in some embodiments, receives and/or provides price and/or trade-related data from, for example, a trading venue such as a stock exchange, via a stock exchange server (e.g., one of the servers 215) or a separate server that is accessible to nodes 205-215 but is not necessarily a node on the peer-to-peer network. Market data allows traders and investors to know the latest price and see and/or manipulate, e.g., tickers and historical trends for security instruments (e.g., the current value of a security and/or currency). Various other engines, storages, and data manipulation techniques (e.g., incorporated into component 520) are contemplated and, in some embodiments, can be integrated as new and/or interchangeable components in wallet 500.

Figure 6:
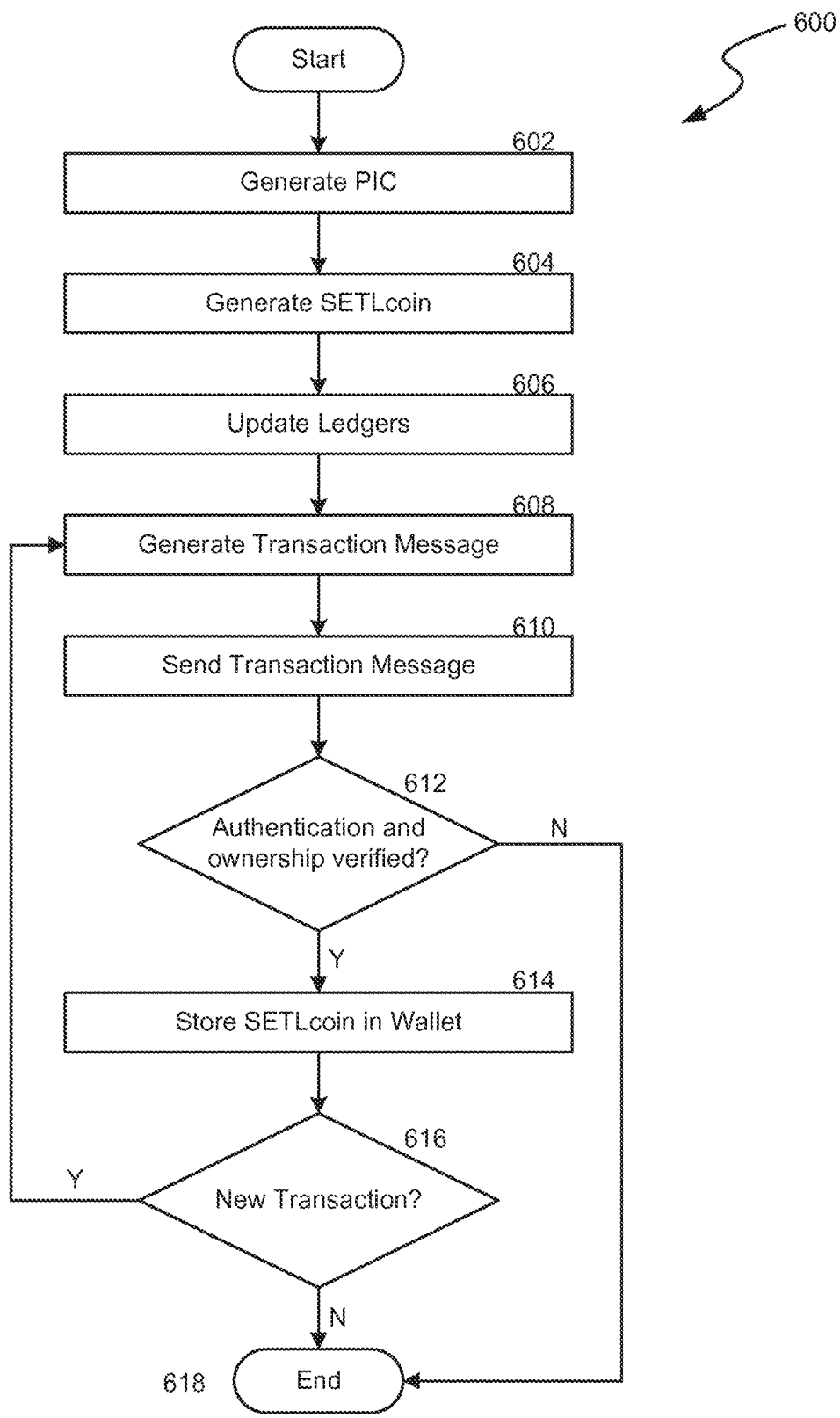
FIG. 6 is a flow diagram implementing various aspects of the described technology.

FIG. 6 is a flow diagram 600 implementing various aspects of the described technology, such as trading an SETLcoin 309 for one or more other cryptographic currencies (e.g., bitcoins) and/or for one or more other SETLcoins 309. An issuer or other entity, at step 602, generates one or more new PICs 308 to represent a particular security (e.g., a type of stock). For example, an issuer or other entity, via its underwriter, designates PIC "MSFT-CS" to represent Microsoft common stock and PIC "MSFT-PS" to represent Microsoft preferred stock. At step 604, the issuer or other entity generates one or more PIC SETLcoins. For example, the issuer or other entity, generates 10,000 MSFT-CS SETLcoins and 500 MSFT-PS SETLcoins. At step 606, for each MSFT-CS and MSFT-PS SETLcoin, the described technology records the issuer's ownership position (e.g., as the first/original owner) in the ledgers of the nodes 205-225. As mentioned above, there are no prior ownership rights when an SETLcoin is first issued; therefore, in one more embodiments, the described technology references an authoritative source (e.g., one or more trusted nodes, such as an elected node of nodes 205-215), a government entity, the Security Exchange Commission, or other entity) to verify and authentic the issuer's transaction.

At step 608, it is assumed that the MSFT-CS and MSFT-PS SETLcoins have changed ownership from the issuer to a new owner (Trader A) and now Trader A wants to sell one or more MSFT-CS SETLcoins to Trader B for a determined value (e.g., 100 bitcoins or other cryptographic currency). As explained in more detail for FIG. 7, the traders' respective wallets 500 each generate respective transactions 303. For example, Trader A's wallet 500 generates a transaction 303 that includes Trader B's address 304, the number of SETLcoins 309 to exchange, and past ownership information 311 (i.e., a record of the previous exchange of the MSFT-CS SETLcoin from the issuer and Trader A). The transaction 303 is digitally signed by Trader A's private key to create digital signature 312, and the transaction message 302 is sent to the network. Similarly, Trader B's wallet 500 generates and sends a transaction message 302 corresponding to his exchange of 100 bitcoins to Trader A's wallet 500.

At step 612, each trader's authenticity is verified based on each trader's respective digital signature 312, and ownership rights are verified based on a proper chain of title (i.e., a history of previously established credible transactions as determined by the ledger and/or other authoritative entity), as explained above. Trader A's ownership rights to the MSFT-CS SETLcoin are verified by the network ledgers and, in some embodiments, Trader B's ownership rights to the 100 bitcoins are also verified by the network ledgers. For example, in one or more embodiments, the described technology is configured to store and verify other cryptographic currency (e.g., bitcoin) transactions in the same ledger as used to verify SETLcoins. In various embodiments, ledgers and/or other verification techniques used by other cryptographic currencies are referenced by the described technology for verifying the other cryptographic currency (e.g., "miners" verify bitcoins based on a "block chain"). In some embodiments, the described technology shares its ledgers and is configured to receive and/or adapt other cryptographic currencies' verification techniques for verifying cryptographic currency ownership. If, at step 612, authentication and/or ownership cannot be verified, then, at step 618, the transaction is ended. However, if authenticity and ownership are verified, then change of ownership is recorded (i.e., a record is entered into the ledgers and/or other cryptographic currency's verification technology) and, at step 614, the MSFT SETLcoins and 100 bitcoins are stored in each trader's respective wallet 500 (e.g., the SETLcoins are stored in SETLcoin storage component 506 and the 100 bitcoins are stored in one or more currency storage components 511). If, at step 616, one of the traders makes another exchange (e.g., Trader B sells a MSFT-CS SETLcoin to Trader C), the flow 600 returns to step 608 where a new transaction is generated for exchanging the MSFT-CS SETLcoins from Trader B's wallet 500 to another trader's (e.g., Trader C's) wallet 500. The flow 600 continues between steps 608-616 for each successive exchange of the same SETLcoin, for example. The process ends at step 618.

With each new successful exchange, ownership verification is improved based on a larger list of successful transactions as recorded in the network ledgers. In some embodiments, the described technology is configured to manage the size of ledgers, which over the course of numerous transactions (e.g., thousands) may grow large in size and, potentially burden the resources of the network 235 and/or the nodes 205-215 resources (e.g., adversely affect bandwidth and storage capacity). Each SETLcoin verification increases the probability that the SETLcoin has a valid chain of title from its issuer to its current owner. Statistically, after a number of successful verifications, the likelihood that a previous verification is fraudulent decreases drastically. For example, after a chain of title is verified, e.g., 1,000 times across the network ledgers, the likelihood that the first or second verification was invalid becomes unlikely. In various embodiments, the described technology can compress, condense, concatenate, or otherwise indicate that previous transactions are considered beyond reproach. For example, after 1,000 successful transaction ledger entries for a particular MSFT-CS SETLcoin, some or all of the previous 999 ledger entries can be compressed (via a verifiable hash, for example). In some embodiments, the described technology compresses, concatenates, or otherwise performs storage efficiency techniques on particular blocks of entries so that other blocks, for one or more reasons, are not affected. For example, ledger entries 1-100 are unaffected by a storage efficiency technique that condenses ledger entries 111-999.

Figure 7:
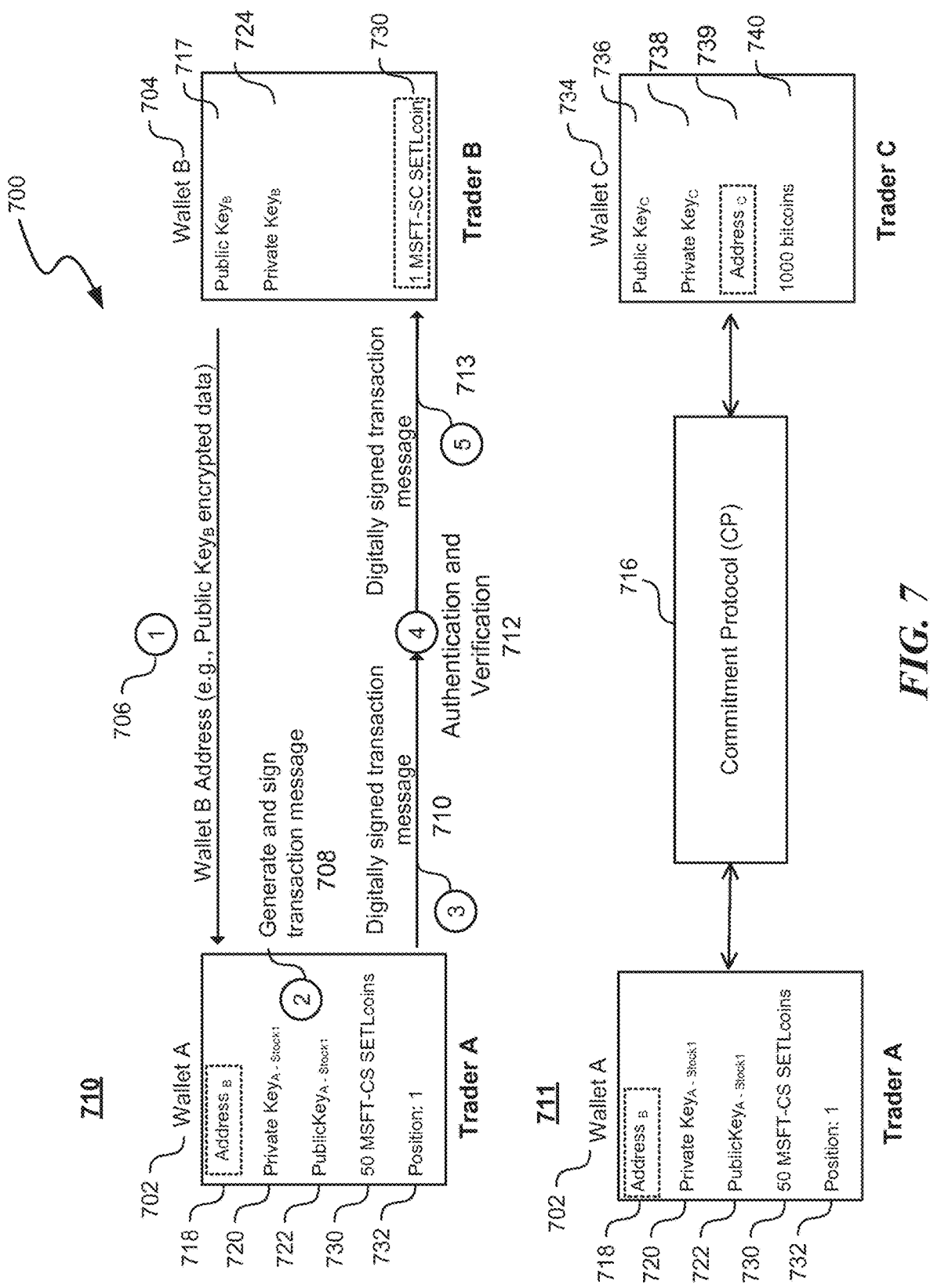
FIG. 7 is a communications flow diagram for the exchange of messages.

FIG. 7 is a communications flow diagram 700 that depicts a simplified example of SETLcoin message exchange. In example 710, Trader A's wallet 702 has 50 MSFT-CS SETLcoins 730, each carrying a value of "1" 732 individual Microsoft common stock. Trader A wants to send 1 of the MSFT-CS SETLcoins 730 from his wallet 702 to Trader B's wallet 704. To simplify this example, Trader A is freely giving the MSFT-CS SETLcoin 730 to Trader B (i.e., it's a gift). At step 1 706, Trader B sends his public address 718 (i.e., a random number encrypted with public key 717) to Trader A's wallet 702 so that Trader A knows where to send the MSFT-CS SETLcoin 730. At step 2 708, Trader A's wallet 702 generates a transaction message 302 for sending the MSFT-CS SETLcoin 730, digitally signs the transaction 303 using the private key 720 associated with the MSFT-CS SETLcoin 730 and, at step 3 710, broadcasts a digitally signed transaction message 302 to the network 235. At step 4 712, the network verifies that the transaction message 302 is authentic (i.e., it is from Trader A based on decrypting the digital signature 312 with public key 722) and that Trader A has proper ownership (i.e., by verifying in the ledgers that Trader A is in the proper chain of title for SETLcoin 730). If step 4 712 is successful, the ledgers make an entry indicating that Trader B is the new owner (based at least on Trader B's public key 717), and, at step 5 713, Trader B's wallet 704 receives and stores the MSFT-CS SETLcoin 730, which is secured with private key 724.

A trader can use the same public address for multiple SETLcoin transactions; however, in one or more embodiments (not shown), new public-private key pairs are generated for each of several SETLcoin transactions (e.g., to secure each SETLcoin with a separate private key). For example, if Trader B wants to purchase Trader A's 49 remaining MSFT-CS SETLcoins 730, Trader B's wallet 704 can generate 49 new public addresses based on 49 new public-private key pairs. The public addresses are sent to Trader A's wallet 702, which creates the corresponding 49 transaction messages 302 for sending each of the 49 MSFT-CS SETLcoins 730 to each of the 49 public addresses of Trader B's wallet 704. Assuming that the transactions are authenticated and that ownership is verified, Trader B now owns the 49 MSFT-CS SETLcoins, each of which is protected by a different private key (i.e., the private key that corresponds to the public key used to generate the address).

In some embodiments, a commitment protocol CP 716 is used by the described technology for exchanging SETLcoins between traders. The CP 716 is a distributed algorithm that helps ensure that each trader is prepared to make and does make his/her part of the exchange. There are at least two steps in the CP 716—a commitment request phase (i.e., phase 1) and a commit phase (i.e., phase 2). During the commitment request phase, a coordinator (e.g., one or more nodes on the network 235) prepares some or all of the processes necessary to exchange a SETLcoin. During the commit phase, in some embodiments, when the necessary processes are verified each wallet broadcasts transaction messages. Opening a transaction to transfer assets (e.g., SETLcoin(s), cash, and/or cash equivalent(s)) using the described technology is a strong guarantee of the availability of funds because funds are not transacted unless the commit phase is successful. Moreover, as implemented by the described technology, the CP 716 can reduce if not remove fraudulent transactions (such as, e.g., kiting where an unscrupulous entity (e.g., an individual, group, organization, and/or business) takes advantage of float between overlapping transactions) by allowing an open transaction only on the available funds associated with traders' wallets, as further described below. In other words, given Wallet's 500 implementation of the CP 714, credit checks are no longer necessary. For example, a trader having a wallet holding 100 SETLcoins can purchase goods and/or services that total up to 100 SETLcoins, however, that wallet cannot be used to purchase goods and/or services that total up to, e.g., 101 SETLcoins. In some embodiments, the described technology can modify trading protocols such that two traders share an open transaction and close it to settle. For example, a trader with a wallet (or other financial storage means, such as a bank account, brokerage account, deposit account) which can provide 1000 USD can share an open transaction to exchange, e.g., 10 IBM-S in a separate wallet, and vice versa.

In trade flow 711, Trader A is exchanging one MSFT-CS SETLcoin 730 for Trader C's 1,000 bitcoins 740. During the commitment request phase, a coordinator (e.g., one or more nodes on the network 235) prepares some or all of the processes necessary to exchange the MSFT-CS SETLcoin 730 for the 1,000 bitcoins 740. For example, the described technology can prepare and coordinate Trader A's wallet 702 and Trader C's wallet 734 to verify that each, for example, are online, have received and sent necessary keys (e.g., 720, 722, 736, and/or 738), have generated and exchanged public addresses (e.g., 718 and 739), have generated proper transaction messages 302, and verified authenticity and ownership. In some embodiments, when the necessary processes are verified during the commit phase, each wallet 702 and 734 broadcasts the transaction messages 302 to the network and the transactions are authenticated and verified. In various embodiments, as part of the CP 716 processes, each trader's transaction messages 302 are sent to and held in a queue managed by a third party to the transaction (e.g., a node 205-210 or an exchange server (e.g., server 215)). Each transaction message 302 is released by the third party as part of or after completion of the commitment phase. The described technology, in one or more embodiments, is configured to implement a portion of the CP 716 processes within the peer-to-peer network and interface with the third party for various other CP 716 processes.

In general, the detailed description of embodiments of the software and/or hardware facilities is not intended to be exhaustive or to limit the technology to the precise form disclosed above. While specific embodiments of, and examples for, the technology are described above for illustrative purposes, various equivalent modifications are possible within the scope of the software and/or hardware facilities, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the software and/or hardware facilities provided herein can be applied to other systems, not necessarily the system described herein. The elements and acts of the various embodiments described herein can be combined to provide further embodiments.

These and other changes can be made to the software and/or hardware facilities in light of the above Detailed Description. While the above description details certain embodiments of the technology and describes the best mode contemplated, no matter how detailed the above appears in text, the described technology can be practiced in many ways. The described technology may vary considerably in its implementation details, while still being encompassed by the technology disclosed herein. As noted above, particular terminology used when describing certain features or aspects of the described technology facilities should not be taken to imply that the terminology is being redefined herein to be restricted to any specific characteristics, features, or aspects of the technology with which that terminology is associated. In general, the terms used in the following claims should not be construed to limit the described technology facilities to the specific embodiments disclosed in the specification, unless the above Detailed Description section explicitly defines such terms. Accordingly, the actual scope of the described technology encompasses not only the disclosed embodiments, but also all equivalent ways of practicing or implementing the described technology.

To reduce the number of claims, certain aspects of the invention are presented below in certain claim forms, but the applicant contemplates the various aspects of the invention in any number of claim forms. Accordingly, the applicant reserves the right to pursue additional claims after filing this application to pursue such additional claim forms, in either this application or in a continuing application.

We claim:

1. A computer-implemented method, comprising:
storing, by a first computing node in a network, a first cryptographic currency in a virtual wallet of the first computing node, wherein the virtual wallet is configured to store one or more types of cryptographic currencies;
receiving, at the virtual wallet of the first computing node, from a second computing node in the network, a public address of the second computing node, the public address indicating where to send the first cryptographic currency for a trade, between the first computing node and the second computing node, of the first cryptographic currency and one or more second cryptographic currencies;
broadcasting, by the first computing node, a first electronic transaction message to a plurality of other computing nodes in the network, the first electronic transaction message comprising an identifier of the first cryptographic currency, the public address of the second computing node, a first digital signature of the first computing node, and an ownership history of the first cryptographic currency;
verifying, by the plurality of other computer nodes, that the first computing node is owner of the first cryptographic currency based on the first electronic transaction message;
verifying, by the plurality of other computer nodes, that the second computing node is owner of the one or more second cryptographic currencies based on a second digital signature of the second computing node and an ownership history of the one or more second cryptographic currencies;
receiving, at the first computing node, second electronic transaction messages from the plurality of other computing nodes, the second electronic transaction messages comprising one or more identifiers of the one or more second cryptographic currencies, the second digital signature of the second computing node, and the ownership history of the one or more second cryptographic currencies;
removing the first cryptographic currency from the virtual wallet of the first computing node and storing the one or more second cryptographic currencies in the virtual wallet of the first computing node based on the plurality of other computing nodes verifying that the first computing node is owner of the first cryptographic currency and that the second computing node is owner of the one or more second cryptographic currencies; and
recording, by the first computing node in one or more digital ledgers, (i) a change in the ownership history of the first cryptographic currency from the first computing node to the second computing node, and (ii) a change in the ownership history of the one or more second cryptographic currencies from the second computing node to the first computing node,
wherein the one or more second cryptographic currencies are of a different type of cryptographic currency than the first cryptographic currency.

2. The computer-implemented method of claim 1, wherein the first electronic transaction message is configured to enable the plurality of other computing nodes to verify that the first computing node is owner of the first cryptographic currency.

3. The computer-implemented method of claim 1, wherein the first electronic transaction message further comprises an identification of a first positional item represented by the first cryptographic currency.

4. The computer-implemented method of claim 1, wherein ownership of the first cryptographic currency is based on at least one entry associated with the one or more digital ledgers.

5. The computer-implemented method of claim 1, wherein the first cryptographic currency is for trading financial securities.

6. The computer-implemented method of claim 1, wherein the second electronic transaction messages further comprise an identification of a second positional item represented by the one or more second cryptographic currencies.

7. The computer-implemented method of claim 1, wherein at least some of the other computing nodes maintain their own digital ledgers.

8. A non-transitory computer-readable storage device having contents adapted to cause one or more processors to perform operations comprising:
  storing, by a first computing node in a network, a first cryptographic currency in a virtual wallet of the first computing node, wherein the virtual wallet is configured to store one or more types of cryptographic currencies;
  receiving, at the virtual wallet of the first computing node, from a second computing node in the network, a public address of the second computing node, the public address indicating where to send the first cryptographic currency for a trade, between the first computing node and the second computing node, of the first cryptographic currency and one or more second cryptographic currencies;
  broadcasting, by the first computing node, a first electronic transaction message to a plurality of other computing nodes in the network, the first electronic transaction message comprising an identifier of the first cryptographic currency, the public address of the second computing node, a first digital signature of the first computing node, and an ownership history of the first cryptographic currency;
  verifying, by the plurality of other computer nodes, that the first computing node is owner of the first cryptographic currency based on the first electronic transaction message;
  verifying, by the plurality of other computer nodes, that the second computing node is owner of the one or more second cryptographic currencies based on a second digital signature of the second computing node and an ownership history of the one or more second cryptographic currencies;
  receiving, at the first computing node, second electronic transaction messages from the plurality of other computing nodes, the second electronic transaction messages comprising one or more identifiers of the one or more second cryptographic currencies, the second digital signature of the second computing node, and the ownership history of the one or more second cryptographic currencies;
  removing the first cryptographic currency from the virtual wallet of the first computing node and storing the one or more second cryptographic currencies in the virtual wallet of the first computing node based on the plurality of other computing nodes verifying that the first computing node is owner of the first cryptographic currency and that the second computing node is owner of the one or more second cryptographic currencies; and
  recording, by the first computing node in one or more digital ledgers, (i) a change in the ownership history of the first cryptographic currency from the first computing node to the second computing node, and (ii) a change in the ownership history of the one or more second cryptographic currencies from the second computing node to the first computing node,
  wherein the one or more second cryptographic currencies are of a different type of cryptographic currency than the first cryptographic currency.

9. The non-transitory computer-readable storage device of claim 8, wherein the first electronic transaction message is configured to enable the plurality of other computing nodes to verify that the first computing node is owner of the first cryptographic currency.

10. The non-transitory computer-readable storage device of claim 8, wherein the first electronic transaction message further comprises an identification of a first positional item represented by the first cryptographic currency.

11. The non-transitory computer-readable storage device of claim 8, wherein ownership of the first cryptographic currency is based on at least one entry associated with the one or more digital ledgers.

12. The non-transitory computer-readable storage device of claim 8, wherein the first cryptographic currency is for trading financial securities.

13. The non-transitory computer-readable storage device of claim 8, wherein the second electronic transaction messages further comprise an identification of a second positional item represented by the one or more second cryptographic currencies.

14. The non-transitory computer-readable storage device of claim 8, wherein at least some of the other computing nodes maintain their own digital ledgers.

15. A network of computing nodes, the network comprising:
  a first computing node, a second computing node, and a plurality of other computing nodes,
  wherein the first computing node is configured to:
    store a first cryptographic currency in a virtual wallet, wherein the virtual wallet is configured to store one or more types of cryptographic currencies;
    receive, at the virtual wallet, from the second computing node, a public address of the second computing node, the public address indicating where to send the first cryptographic currency for a trade, between the first computing node and the second computing node, of the first cryptographic currency and one or more second cryptographic currencies; and
    broadcast a first electronic transaction message to the plurality of other computing nodes, the first electronic transaction message comprising an identifier of the first cryptographic currency, the public address of the second computing node, a first digital signature of the first computing node, and an ownership history of the first cryptographic currency;
  wherein the plurality of other computing nodes is configured to:
    verify that the first computing node is owner of the first cryptographic currency based on the first electronic transaction message; and
    verify that the second computing node is owner of the one or more second cryptographic currencies based on a second digital signature of the second computing node and an ownership history of the one or more second cryptographic currencies;
  wherein the first computing node is further configured to:
    receive second electronic transaction messages from the plurality of other computing nodes, the second electronic transaction messages comprising one or more identifiers of the one or more second cryptographic currencies, the second digital signature of the second computing node, and the ownership history of the one or more second cryptographic currencies;

remove the first cryptographic currency from the virtual wallet of the first computing node and store the one or more second cryptographic currencies in the virtual wallet based on the plurality of other computing nodes verifying that the first computing node is owner of the first cryptographic currency and that the second computing node is owner of the one or more second cryptographic currencies; and record, in one or more digital ledgers, (i) a change in the ownership history of the first cryptographic currency from the first computing node to the second computing node, and (ii) a change in the ownership history of the one or more second cryptographic currencies from the second computing node to the first computing node, wherein the one or more second cryptographic currencies are of a different type of cryptographic currency than the first cryptographic currency.

16. The network of claim 15, wherein the first electronic transaction message is configured to enable the plurality of other computing nodes to verify that the first computing node is the owner of the first cryptographic currency.

17. The network of claim 15, wherein the first electronic transaction message further comprises an identification of a first positional item represented by the first cryptographic currency.

18. The network of claim 15, wherein ownership of the first cryptographic currency is based on at least one entry associated with the one or more digital ledgers.

19. The network of claim 15, wherein the first cryptographic currency is for trading financial securities.

20. The network of claim 15, wherein the second electronic transaction messages further comprise an identification of a second positional item represented by the one or more second cryptographic currencies.

21. The network of claim 15, wherein at least some of the other computing nodes maintain their own digital ledgers.

* * * * *